United States Patent
Sedgewick et al.

[19]

[11] Patent Number: 5,998,890
[45] Date of Patent: Dec. 7, 1999

[54] LINEAR MOTOR WITH IMPROVED COIL DESIGN AND HEAT REMOVAL

[75] Inventors: Richard D. Sedgewick, Dover; David J. Carroll, Strafford, both of N.H.

[73] Assignee: Airex Corporation, Dover, N.H.

[21] Appl. No.: 09/281,112

[22] Filed: Mar. 29, 1999

Related U.S. Application Data

[63] Continuation of application No. 08/694,617, Aug. 13, 1996.

[51] Int. Cl.$^6$ .................................................. H02K 41/00
[52] U.S. Cl. ............................................. 310/12; 310/64
[58] Field of Search .............................. 310/12, 13, 14, 310/64, 270

[56] References Cited

U.S. PATENT DOCUMENTS

| | | | |
|---|---|---|---|
| Re. 34,674 | 7/1994 | Beakley et al. ............................. | 310/12 |
| 3,913,045 | 10/1975 | Von Starck ................................. | 336/60 |
| 3,969,644 | 7/1976 | Nowak ....................................... | 310/152 |
| 4,303,017 | 12/1981 | Dull ............................................ | 104/294 |
| 4,331,896 | 5/1982 | Sedgewick ................................. | 310/179 |
| 4,369,383 | 1/1983 | Langley ..................................... | 310/12 |
| 4,575,211 | 3/1986 | Matsumura et al. ...................... | 354/403 |
| 4,749,921 | 6/1988 | Chitayat .................................... | 318/135 |

*Primary Examiner*—Nestor Ramirez
*Assistant Examiner*—Judson H. Jones
*Attorney, Agent, or Firm*—Hayes Soloway Hennessey Grossman & Hage, PC

[57] ABSTRACT

A linear motor comprising a DC magnetic field of alternating polarity arranged in a longitudinal axis, a coil assembly located substantially in a plane parallel to and immersed in the alternating magnetic field, said coil assembly containing individual coil loops of essentially rectangular shape and having end turn areas arranged parallel to said longitudinal axis of the magnet field and coil side areas being perpendicular to said longitudinal axis of the magnetic field with each coil side having a coil side width (CSW) and each coil loop having a coil outside width (COW) and coil inside width (CIW) such that COW=CIW+(2×CSW) wherein the coils have a coil outside length (COL), forming a coil assembly area (CAA) approximately equal to COW×COL and said coil assembly has a coil assembly thickness (CAT) in a direction creating acoil assembly volume (CAV) approximately equal to the coil assembly area (CAA) times the coil assembly thickness (CAT) pursuant to the following equation: CAV≈CAT×COW×COL. wherein said assembly is formed with a plurality of phases each formed in the manner of the first phase, each phase uniformly and sequentially offset from adjacent phases and means for switching current successively between the phases thereby alternating the magnetic fields within the coil assembly sequentially, said plurality of offset phases substantially filling the coil inside width (CIW) of the first phase, such that CIW=CSW× (#ϕ−1). The above coil assembly optimally includes a longitudinal opening along the end turn areas within the coil assembly volume allowing non-magnetic metallic members for heat dissipation and structural strength, including a mounting bracket on one end turn area, and a heat sink cap enclosing the opposite end turn area.

12 Claims, 4 Drawing Sheets

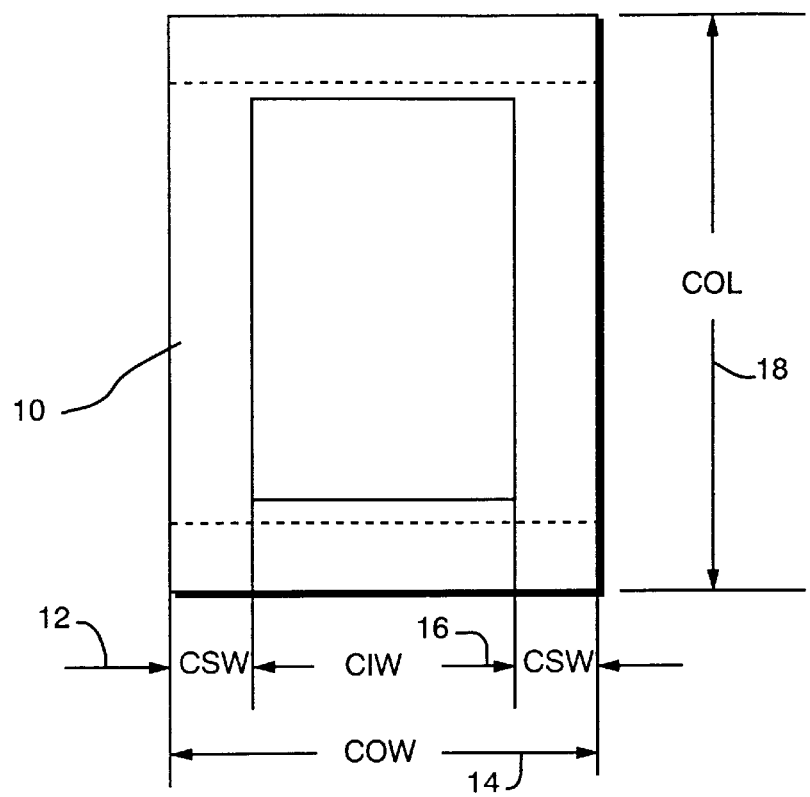
FIG. 1
FIG. 1A
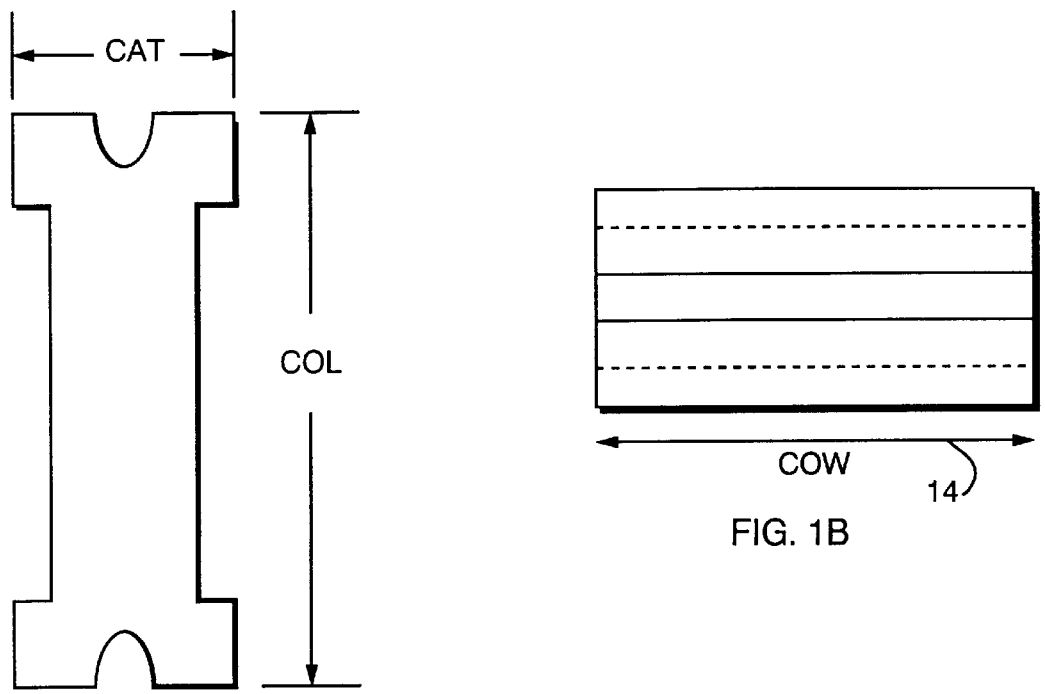
FIG. 1B

LINEAR MOTOR WITH IMPROVED COIL DESIGN AND HEAT REMOVAL

This is a continuation of copending application Ser. No. 08/694,617 filed on Aug. 13, 1996 pending.

BACKGROUND OF THE INVENTION

1. Field of the Invention

The present invention relates to new and improved linear motors, especially those linear motors having moving coils. As described herein, the coils of the present invention provide more effective multi-pole, multi-phase structures for use in a linear motor, and the present invention also describes improvements for the dissipation of heat from a linear motor resulting in better performance and/or longevity.

2. Description of the Prior Art

Linear motors which directly produce a linear force in response to an electric current are known, and the prior art has been previously reviewed. For example, U.S. Pat. No. Re 34,674 notes that linear drives have been used in many areas, including automation and robotic positioning systems, printers and disk drive units. One type of linear motor is, e.g. the linear stepper motor, which is similar to a rotary stepper motor. A second type of linear motor is the moving magnet motor. These motors incorporate a fixed wound stator assembly with the load attached to a moving magnet assembly. Yet another type of linear motor is the moving coil linear motor. These can be either brush or brushless designs having a moving coil passing through an air gap created by either two rows of permanent magnets and magnetic circuit completion means or back iron with one row of permanent magnets and a magnetic circuit completion means using one back iron and one ferromagnetic bar.

However, the moving coil windings in these motors are generally the limiting factor to the force that can be developed due to heat buildup in the windings. The linear force developed is proportional to the current passing through the windings, the number of turns of wire and the flux density in the magnetic circuit. Given a constant flux density and a given number of turns in the windings, force is then proportional to the current in the windings. At the same time, the power to be dissipated as heat is proportional to the resistance of and current in the winding and builds at a rate much greater than the increase in force. This generally results in a current limitation in the coils being required to prevent overheating of the coil assembly.

With regards to the specific linear motor described in U.S. Pat. No. Re. 34,674, said motor was defined as having a central row of alternating permanent magnets, with multi-phase, multi-pole coil assemblies located on both sides of the magnet row. That is, the coil assemblies were said to be formed of a series of individual coils connected in a multi-phase, multi-pole relationship. Two coil assemblies are described, each coil located substantially in a plane parallel to a magnet plane on opposite sides of a magnet row. Furthermore, the coil loop thickness was said to be approximately said individual coil loop total width divided by two times the number of phases, and no foreign material, such as ferromagnetic laminations or other metallic materials, was located in the volume of the coil assembly. Finally, a minimum of two coils per phase were described, in which coils of the same phase are in contact with one another.

Other prior art motor designs and related subject matter has been disclosed, and reference is made to the following U.S. Patents for additional background information: U.S. Pat. No. 4,749,921 "Linear Motor With Non-Magnetic Armature"; U.S. Pat. No. 4,331,896 "Zig-Zag Windings, Winding Machine and Method"; U.S. Pat. No. 4,303,017 "Long Stator Linear Motor Without Iron"; U.S. Pat. No. 4,369,383 "Linear DC Permanent Magnet Motor"; U.S. Pat. No. 4,575,211 "Brushless D.C. Motor" U.S. Pat. No. 3,913,045 "Linear Moving Field Inductor For Electromagnetic Pumps, Conveyor Troughs or Agitator Reels for Liquid Metals"; U.S. Pat. No. 3,969,644 "Pulse Generator With Asymmetrical Multi-Pole Magnet".

As can therefore be seen from the above, the moving coil windings emerge as a limiting factor to the force that can be developed due to the heat buildup in the windings. That being the case, there has been a long-standing need to develop new and improved coil designs to improve motor performance, i.e., a linear motor which develops large accelerations, static force and speeds, and which does not require large numbers of expensive magnets, and does not have a coil assembly which overheats.

Accordingly, it is a first object of this invention to provide a coil configuration which improves the configurations reported in the prior art, and which can be described in part as containing a coil assembly which contains at least two phases having one coil loop per phase, comprised of individual coil loops of essentially rectangular shape, with end turn areas arranged parallel to the longitudinal axis of a magnetic field wherein an opening is provided within the volume of the coil assembly, and wherein one coil side of the 2nd phase is positioned parallel to and between the coil sides of the first phase for the purpose of improved linear motor performance.

More specifically, and again with reference to the prior art linear motor designs summarized above, such designs have not been optimized for heat removal as the coil assemblies were generally only air-cooled and had poor heat sinking of the coil assemblies. That is, the coils themselves were not fully distributed to provide maximum transfer of heat to a heat sink. Furthermore, the prior art has yet to provide a coil configuration wherein an opening within the volume of the coil loops, as noted above, is specifically located in the end turn areas, disposed along the longitudinal axis of the magnetic path, for the purpose of improving heat dissipation, and for the placement of thermally conductive non-magnetic material for structural support.

Additionally, while linear motors of the prior art contained magnetic circuit completion means, said completion means itself had not been structurally optimized for heat removal, with regards to, as herein described, the use of plates, and plate separating ribs comprising a plurality of air gaps between separating blocks along the magnet track axis.

It is also a primary object of the invention to provide a permanent magnet linear motor which overcomes the disadvantages of the prior art and provides a new and improved coil geometry, including a heat sink attached to opposite end turn areas, that can be described as a heat sink cap to improve motor performance.

SUMMARY OF THE INVENTION

A linear motor comprising a DC magnetic field of alternating polarity arranged in a longitudinal axis, a coil assembly located substantially in a plane parallel to and immersed in the alternating magnetic field, said coil assembly containing individual coil loops of essentially rectangular shape and having end turn areas arranged parallel to said longitudinal axis of the magnetic field and coil side areas being perpendicular to said longitudinal axis of the magnetic field with each coil side having a coil side width (CSW) and each coil loop having a coil outside width (COW) and coil inside width (CIW) such that COW=CIW+(2×CSW). wherein the coils have a coil outside length (COL), forming a coil assembly area (CAA) approximately equal to COW×COL and said coil assembly has a coil assembly thickness (CAT) in a direction creating a coil assembly volume (CAV) approximately equal to the coil assembly area (CAA) times the coil assembly thickness (CAT) i.e. CAV≈CAT×COW× COL, wherein said assembly is formed with a plurality of phases each formed in the manner of a first phase, each phase uniformly and sequentially offset from adjacent phases and means for switching current successively between the phases thereby alternating the magnetic fields within the coil assembly sequentially, said plurality of offset phases substantially filling the coil inside width (CIW) of the first phase, such that CIW=CSW×(#φ−1).

In alternative embodiment, the present invention includes a linear motor comprising a DC magnetic field of alternating polarity arranged in a longitudinal axis, a coil assembly located substantially in a plane parallel to and immersed in the alternating field, said coil assembly containing individual coil loops of essentially rectangular shape having end turn areas arranged parallel to said longitudinal axis of the magnetic field and coil side areas being perpendicular to said longitudinal axis of the magnetic field, further including a mounting bracket attached to one end turn area and a heat sink cap attached to the end turn area opposite said mounting bracket.

Finally, in yet another alternative embodiment, the present invention relates to a linear motor comprising a DC magnetic field of alternating polarity arranged in a longitudinal axis forming a magnetic path, a coil assembly located substantially in a plane parallel to and immersed in the alternating magnetic field, said coil assembly containing individual coil loops of essentially rectangular shape having end turn areas arranged parallel to said longitudinal axis of the magnetic field and coil side areas being perpendicular to said longitudinal axis of the magnetic field, wherein said coil assembly has a volume in the end turn areas through which an opening parallel to the longitudinal axis of the magnetic field is provided to accommodate cooling and support means including a heat sink cap.

DESCRIPTIONS OF DRAWINGS

FIG. 1 is a front view of a single coil appropriate for a 4 phase coil assembly.

FIG. 1A is a side view, and

FIG. 1B is a top view.

DETAILED DESCRIPTION OF THE PREFERRED EMBODIMENTS

Referring now to FIG. 1, FIG. 1A and 1B a basic view of coil loop 10 is illustrated. In addition, at 12 is what is defined herein as the coil side width (CSW), at 14 is the coil outside width (COW) and at 16 is shown the coil inside width (CIW) and at 18 a coil outside length (COL) is shown. In addition, it can be appreciated that notwithstanding the two-dimensional drawing provided for by FIG. 1, the coil illustrated therein has a thickness in the direction perpendicular to the area bounded by COW and COL. Accordingly, and with reference to the above definitions, the present invention, as previously noted above, first includes a linear motor comprising a DC magnetic field of alternating polarity arranged in a longitudinal axis, a coil assembly located substantially in a plane parallel to and immersed in the alternating magnetic field, said coil assembly containing individual coil loops of essentially rectangular shape and having end turn areas arranged parallel to said longitudinal axis of the magnetic field and coil side areas being perpendicular to said longitudinal axis of the magnetic field with each coil side having a coil side width (CSW) and each coil loop having a coil outside width (COW) and coil inside width (CIW) such that COW=CIW+(2×CSW)., wherein the coils have a coil outside length (COL), forming a coil assembly area (CAA) approximately equal to COW×COL and said coil assembly has a coil assembly thickness (CAT) in a direction creating a coil assembly volume (CAV) approximately equal to the coil assembly area (CAA) times the coil assembly thickness (CAT) i.e. CAV≈CAT×COW× COL, wherein said assembly is formed with a plurality of phases each formed in the manner of the first phase, each phase uniformly and sequentially offset from adjacent phases and means for switching current successively between the phases thereby alternating the magnetic fields within the coil assembly sequentially, said plurality of offset phases substantially and more preferably filling the coil inside width (CIW) of the first phase, such that CIW=CSW× (#φ−1).

Those skilled in the art will recognize that the sequential related excitation of the phases of the motor, as de3scribed above, result in production of force or linear movement of the coil assembly.

Figure 2:
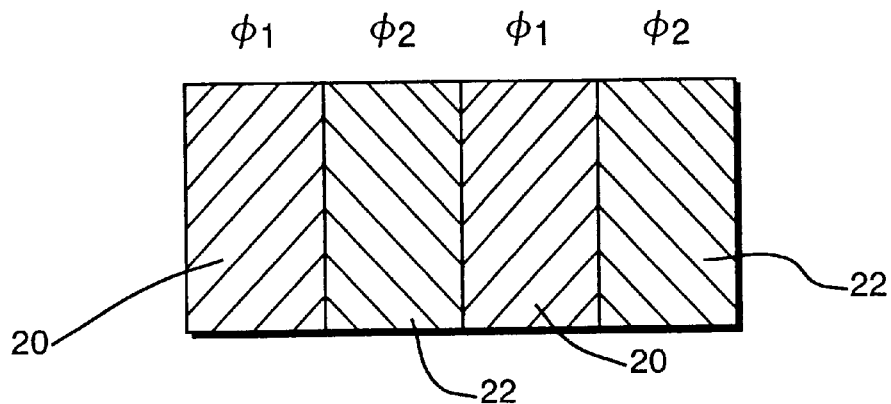
FIG. 2 is a cross section of a coil assembly of the present invention, illustrating the two coil loops of a two phase coil assembly (end turns not shown).

Having noted above, attention is next directed to FIG. 2, which illustrates in cross-section two coils, 20 and 22, wherein said coils represent individual phases designated as $\phi_1$ and $\phi_2$. As shown, the coil sides of the same phase do not abut and are spaced such that the coil side of the second coil loop 22 is positioned substantially parallel to and between the coil sides of the first coil loop 20.

Preferably, the coil loops are wound coils, and are would from bondable magnet wire. In particular, the coils can be optimally wound via the use of a winding machine, e.g., automated winding equipment made available by Airex Corporation, Dover, N.H. The coil end turns are also preferably formed during winding, but those skilled in the art will recognized that the coils can optionally be wound straight, and bent after winding to their final shape. Furthermore, a fiber cloth prepreg can be attached to the external coil surfaces, for support and protection there of.

Figure 6:
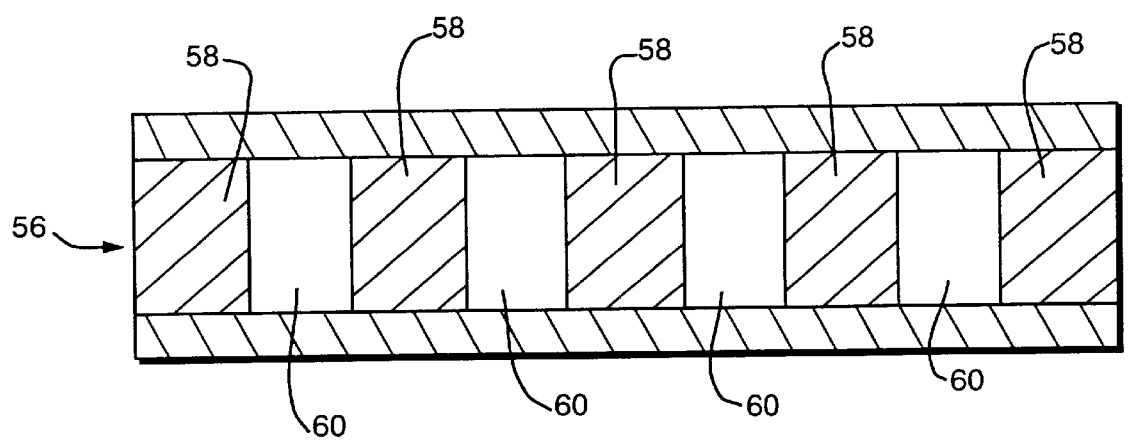
FIG. 6 is a cross-sectional view of the magnet track plate separating blocks and air gaps.

With respect to the above referenced embodiment, there are still other additional preferred modifications. For example, in a preferred configuration, the coil assembly contains a number of phases containing a number of coil loops wherein each phase had a minimum of one coil loop. Furthermore, the DC magnetic field of alternating polarity is preferably comprised of a plurality of magnets aligned in a row forming a magnet plane having a longitudinal axis. In addition, the magnetic circuit completion means itself preferably comprises plates and a plate separating rib, wherein the plate separating rib is a multiplicity of blocks alternating with air opening running longitudinally along the magnet track. Such alternate air gaps improve heat dissipation as shown in FIG. 6.

Furthermore, with regards to specific preferred dimensions, when the linear motor described above comprises a magnet track having a magnet pitch of 1.2 inches (the distance from a given point on one magnet to the same point on the adjacent magnet) and a 3 phase ($\phi$) coil assembly, employing 3 coil loops, the COW is about 1.6 inches, the CSW about 0.4 inches, and a CIW of about 0.8 inches in dimension. The thickness in the direction perpendicular to the coils sides is about 3/16 inches and the thickness perpendicular to the coil end turn areas is about 3/8 inches.

Figure 3:
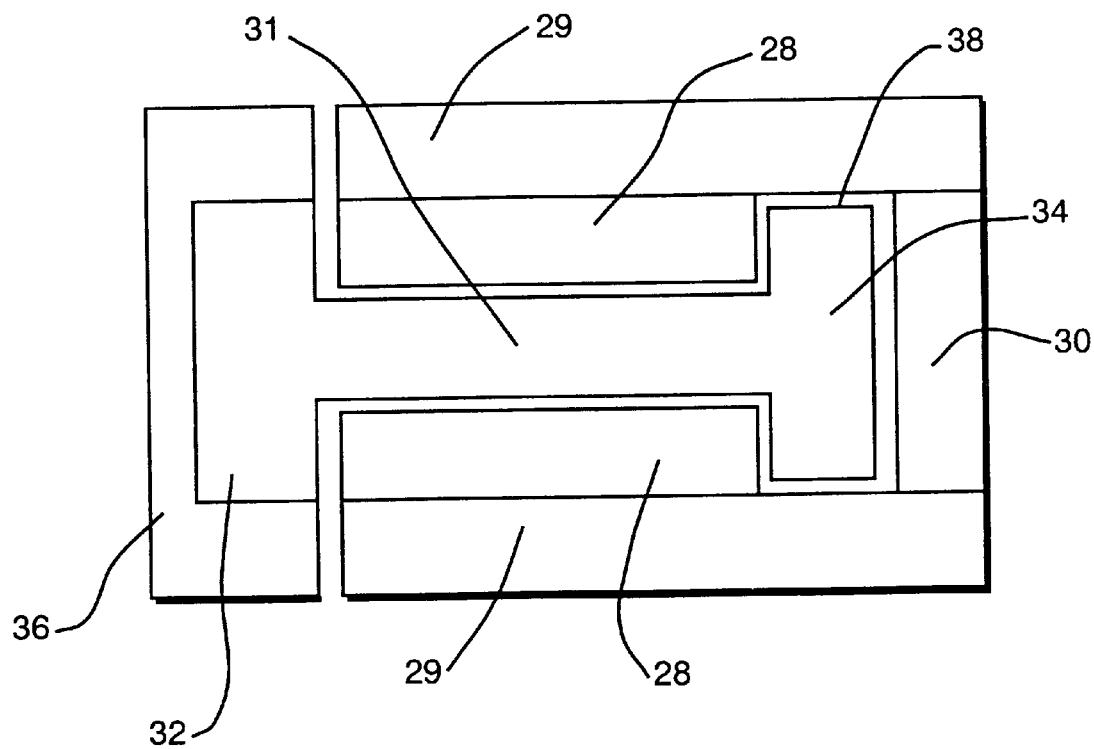
FIG. 3 is an end view of a coil assembly of the present invention, illustrating the placement of a heat-sink cap attached to the end turn area opposite a mounting bracket.

Turning next to FIG. 3, an end view of a linear motor is shown comprising a DC magnetic field formed by magnets 28 which are aligned in a row with alternating polarity arranged in a longitudinal axis. Also illustrated is the magnetic circuit completion means 29 and separating rib 30, a coil assembly 31 located in a plane parallel to and immersed in the alternating magnetic field, said coil assembly containing individual coil loops of essentially rectangular shape, having end turn areas 32 and 34 arranged parallel to said longitudinal axis of the magnet plane. Also shown is a mounting bracket 36 attached to one end turn area and a heat sink cap 38 attached to the end turn area 34 positioned opposite to said bracket.

Figure 4:
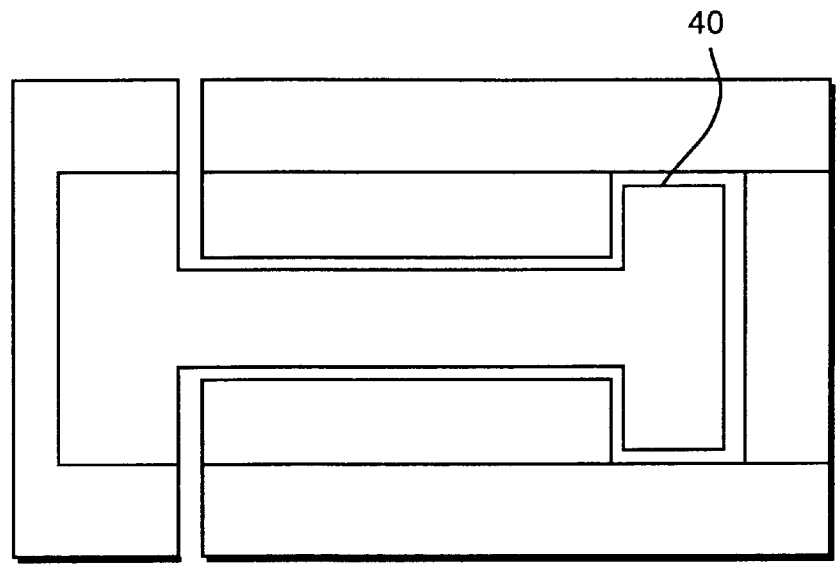
FIG. 4 is an end view of a coil assembly of the present invention, also illustrating the placement of a heat-sink cap, wherein said cap substantially surrounds the end turn area.

It can be appreciated that while heat sink cap 38 is shown attached to the end turn area opposite to the mounting bracket, the heat sink cap may also be positioned to surround the ends of the coils. This is shown more clearly in FIG. 4, wherein the heat sink cap 40 is specifically illustrated as surrounding the ends of the coils loops. Additionally, with respect to the embodiment illustrated in FIGS. 3 and 4, it is to be noted that the heat sink cap preferably comprises a metallic material, such an aluminum.

Furthermore, and without being bound by any particular theory, in operation, the placement of the heat sink cap as shown is believed to improve heat dissipation to the extent that the cap uniformly distributes any uneven heat generated. This may particularly be the case at slow speeds or in stationary holding position, wherein one coil may build-up heat at a far greater rate than its neighbor.

Furthermore, it can be appreciated that heat sink fins may be optionally added to the heat sink cap to further enhance the ability of the cap to dissipate heat build-up. Such fins, taking various forms, preferably extend in the direction of coil travel thus maximizing air and heat transfer when moving quickly.

It is also to be noted that in addition to the advantages supplied by the heat sink cap, noted above, the cap itself has been found to act as a stiffening structure to minimize uneven magnetic as well as inertial forces across the entire coil assembly. This strengthening is especially important when the motor is operating at very high temperature or at very high power levels and/or speed.

Figure 5:
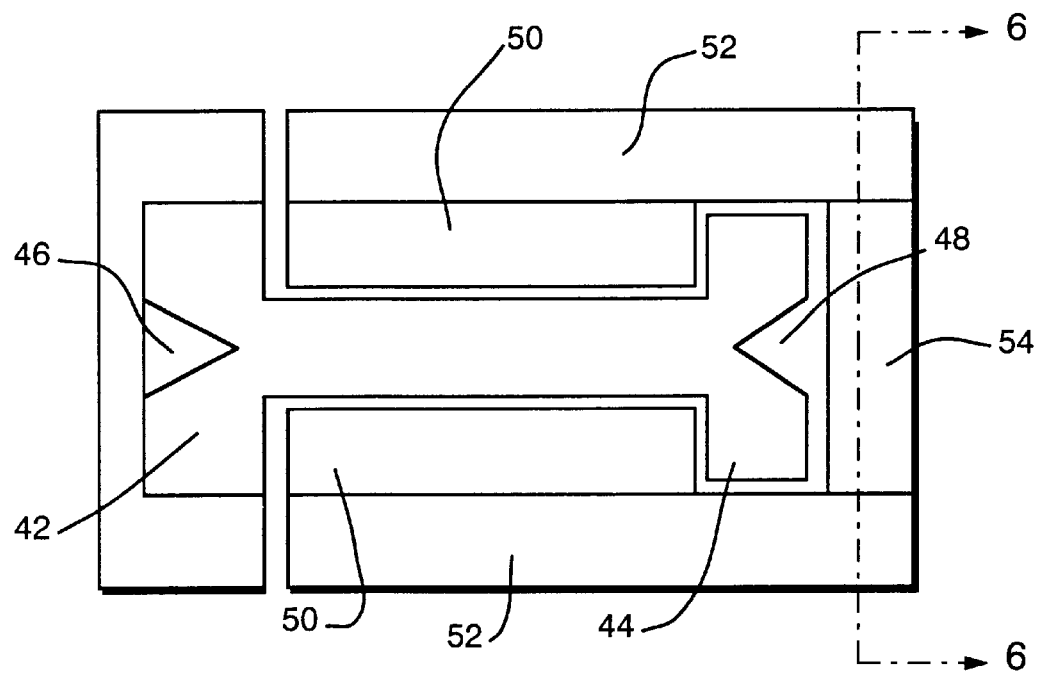
FIG. 5 is yet another end view of a coil assembly of the present invention, wherein the end turn areas of the coil contain an opening extending into the volume of the coil loops, with heat-sink cap in place.

Attention is next directed to FIG. 5, which illustrates that aspect of the present invention wherein the end turn areas of the coil contain an opening extending into the volume of the coil loops. That is, the end turn areas 42 and 44 each respectively contain an opening 46 and 48 inside the volume of said coil assembly. The provision of said openings, it can be appreciated, provides additional surface area to the coil which in operation thereof, allows for more efficient heat dissipation. Furthermore, said opening can be optionally filled with a structural support and/or heat conducting material, such as a brass rod, solder, alumina, lead wire, or the heat sink cap, which was described earlier.

Finally, and with reference to FIG. 5 for illustration purposes, the linear motor of the present invention can preferably include at 50 a plurality of magnets aligned in a row forming a magnet plane having a longitudinal axis, a magnetic circuit completion means comprising a plate 52 and plate separating rib 54. Now, with reference to FIG. 6, which is a view taken along line A—A of FIG. 5, the plate separating rib is again illustrated at 56 showing a multiplicity of blocks 58 with openings 60. It can therefore be appreciated that such multiplicity of blocks and openings provides yet additional opportunity for heat to escape from the linear motors of the designs and configurations described herein.

In sum, the foregoing disclosure and description of the invention are illustrative and explanatory thereof, and various changes in the size, shape and materials, as well as in the details of the illustrative embodiments may be made without departing from the spirit of the invention, all such changes being contemplated to fall within the scope of the appended claims.

What is claimed is:

1. A coil for a linear motor comprising:

individual coil loops of essentially rectangular shape and having end turn areas arranged parallel to a longitudinal axis of an alternating magnetic field and coil side areas being perpendicular to said longitudinal axis of the magnetic field with each coil side having a coil side width (CSW) and each coil loop having a coil outside width (COW) and coil inside width (CIW) such that COW=CIW+(2×CSW), wherein the coils have a coil outside length (COL), forming a coil assembly area (CAA) approximately equal to COW×COL and said coil assembly has a coil assembly thickness (CAT) in a direction creating a coil assembly volume (CAV) approximately equal to the coil assembly area (CAA) times the coil assembly thickness (CAT), pursuant to the following equation: CAV≈CAT×COW×COL, wherein said assembly is formed with a plurality of phases each formed in the manner of the first phase, each phase uniformly and sequentially offset from adjacent phases, said plurality of offset phases substantially filling the coil inside width (CIW) of the first phase, such that CIW=CSW×(#φ−1), wherein the #φ represents the number of phases.

2. The coil of claim 1, wherein said coil assembly contains a number of phases containing a number of coil loops wherein each phase has a minimum of one coil loop.

3. The coil of claim 1, wherein the end turn volume on both sides of the coil assembly contain an opening in said volume substantially parallel to the longitudinal axis of the magnetic field.

4. The coil of claim 3, wherein the opening in the volume is a groove or penetration into the end turn areas.

5. The coil of claim 3, wherein the opening into the volume is substantially surrounded by the wire forming the coils.

6. The coil of claim 3, wherein said opening contains materials providing structural support and heat conduction or dissipation comprising a brass rod, solder, alumina, lead wire or a heat sink cap.

7. The coil of claim 1, wherein the end turn areas are parallel to the longitudinal axis of the magnetic field and contain thermally conductive non-magnetic metallic members along the longitudinal axis for structural support and heat conduction.

8. The coil of claim 1, wherein a fiber-cloth prepreg is attached to the wire forming the assembly.

9. The coil of claim 1, wherein said magnetic field of alternating polarity comprises a plurality of magnets aligned in a row forming a magnet plane having a longitudinal axis.

10. The coil of claim 1, further comprising magnetic circuit completion means comprising plates and a plate separating rib.

11. The coil of claim 8, wherein the plate separating rib is a multiplicity of blocks spaced longitudinally along a magnet track, providing alternating support and air gaps.

12. The coil of claim 1, wherein said coil comprises a 3 phase (φ) coil assembly, containing 3 coil loops, wherein the COW is about 1.6 inches, the CSW about 0.4 inches, the CIW is about 0.8 inches in dimension, and the thickness in the direction perpendicular to the coils sides is about 3/16 inches, and the thickness perpendicular to the coil end turn areas is about 3/8 inches when used with a magnet track having magnets spaced on a 1.2 inch pitch.

* * * * *